J. S. CLARKE.
DEVICE FOR CRANKING AUTOMOBILES.
APPLICATION FILED JULY 1, 1910.
1,006,063.
Patented Oct. 17, 1911.
2 SHEETS—SHEET 1.
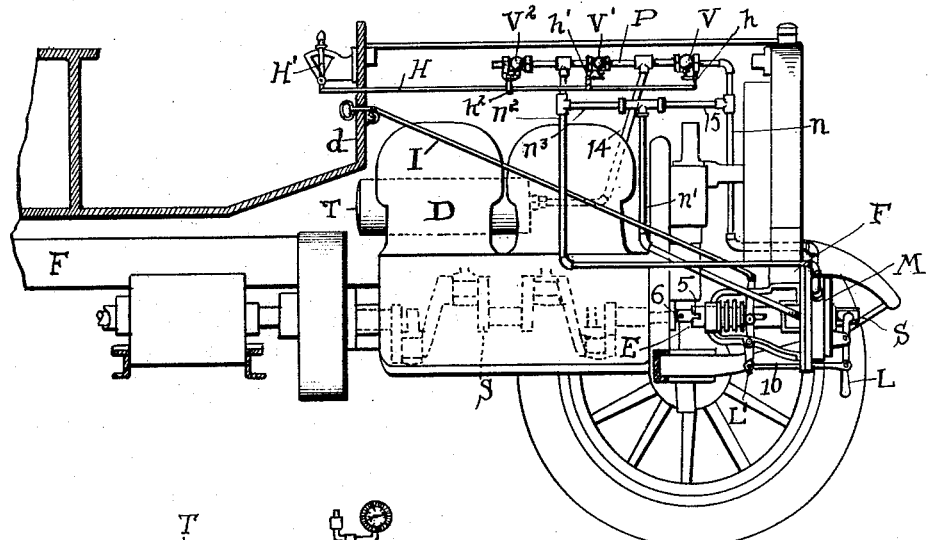
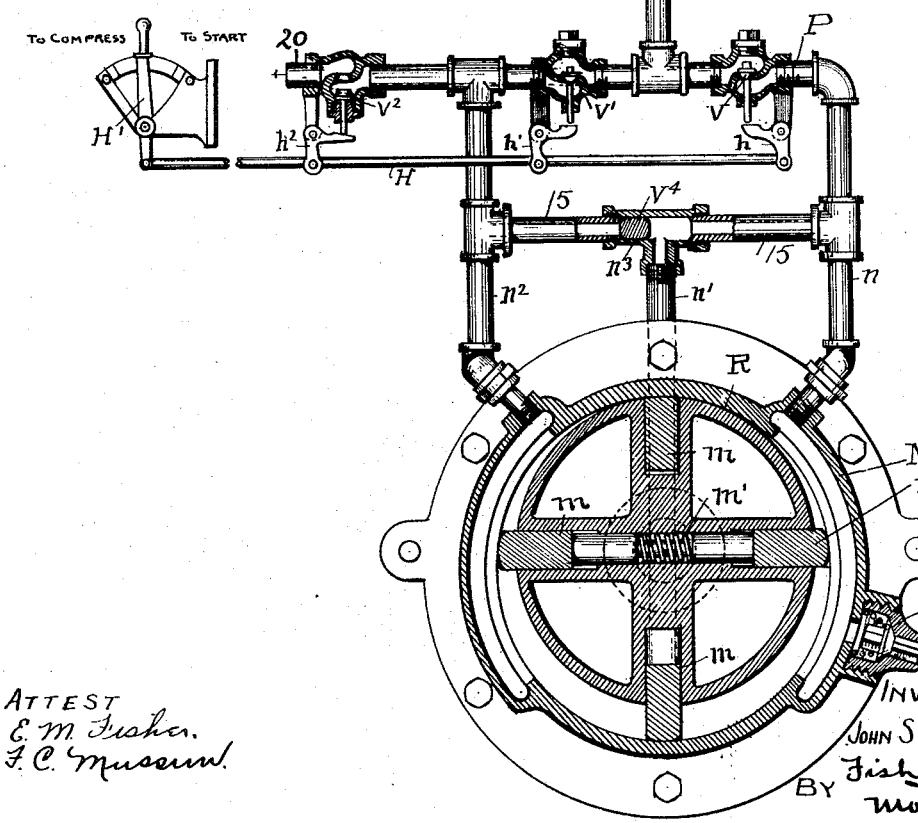
ATTEST
E. M. Fisher.
F. C. Museum.
INVENTOR
JOHN S CLARKE
BY Fisher
   Moest ATTYS J. S. CLARKE.
DEVICE FOR CRANKING AUTOMOBILES.
APPLICATION FILED JULY 1, 1910.
1,006,063.
Patented Oct. 17, 1911.
2 SHEETS—SHEET 2.
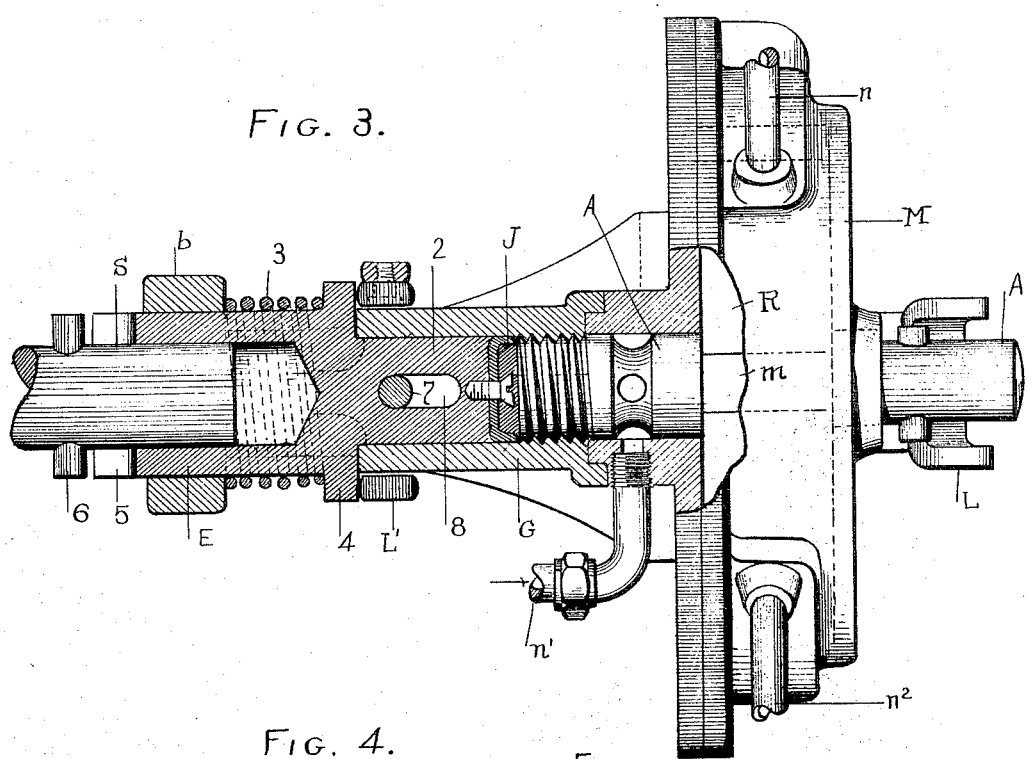
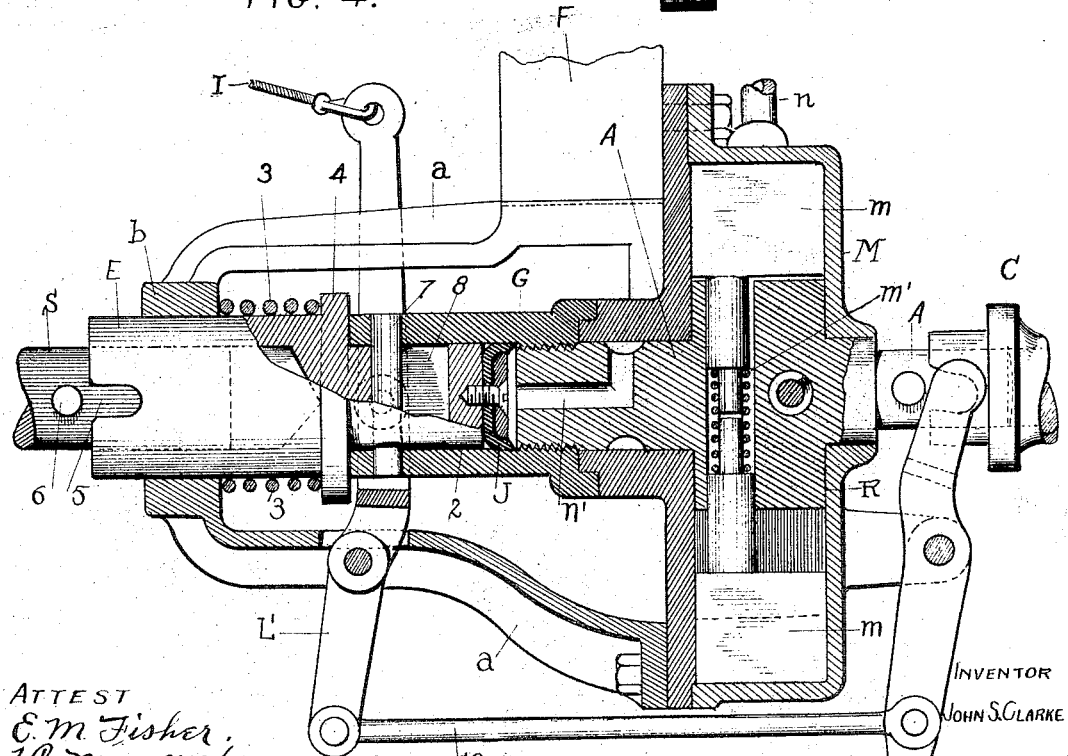

UNITED STATES PATENT OFFICE.

JOHN S. CLARKE, OF EAST CLEVELAND, OHIO, ASSIGNOR OF ONE-HALF TO ALEXANDER H. LANGELL, OF CLEVELAND, OHIO.

DEVICE FOR CRANKING AUTOMOBILES.

1,006,063. Specification of Letters Patent. Patented Oct. 17, 1911.

Application filed July 1, 1910. Serial No. 569,862.

*To all whom it may concern:*

Be it known that I, JOHN S. CLARKE, citizen of the United States, residing at East Cleveland, in the county of Cuyahoga and State of Ohio, have invented certain new and useful Improvements in Devices for Cranking Automobiles, of which the following is a specification.

My invention relates to devices for cranking automobiles, and the object of the invention is to provide an automobile with a source of energy and means adapted to be operated from the seat of the driver to apply said energy to the crank or engine shaft to start the machine as well as means to maintain the supply of energy or power, all substantially as shown and described and particularly pointed out in the claims.

In the accompanying drawings, Figure 1 is a side elevation of the front portion of an automobile with the parts embodying the invention in working relation thereon. Fig. 2 is an enlarged and somewhat diagrammatic side elevation partly in section of the more immediate or essential positions of the invention. Fig. 3 is a relatively enlarged side elevation of the motor casing and the corresponding end of the crank shaft and the clutch mechanism therewith, and Fig. 4 is a longitudinal sectional elevation of Fig. 3.

Briefly stated, the invention comprises a motor to crank the engine shaft and a tank of stored energy, say compressed air to drive the motor. Incident to this are the means for converting the motor into a pump to maintain the supply of air in the said tank, and the additional means for setting the motor to either task from the driver's seat.

The details of the invention are associated with the foregoing.

Now viewing the drawings, Figs. 1 and 2, M represents a so-called rotary motor which is in power relations with engine or crank shaft S, but is convertible into an air compressor by reversal of operation to fill or store the compressed air tank T when necessary. Of course I could depend on some other source or means for maintaining a supply of air in said tank, but it is a part of my present invention to do this by means of the motor which cranks the machine and is out of working relations with the machine except as cranking for starting occurs. The motor is therefore at liberty to do other work, and it is convertible into a rotary pump for forcing air into said tank when the supply is diminished and as a pressure indicator on the tank will disclose. Said tank also has a safety valve to prevent overcharging and explosion. In the first instance, or when an installation has just been completed and there is no energy in tank T, I start the engines with the usual hand crank C, the head of which is shown in Fig. 4. The shaft S is operatively extended both for this purpose and the mounting and operation of the combined motor and pump M, as will now appear. Thus, the pump casing indicated by M is made rigid with the framework F of the machine and said frame has arms *a* extending inward and terminating in a bearing *b* for the slidable clutch member E mounted in said bearing and sleeved over the end of shaft S. Next to this clutch member I employ a tubular valve casing G which is threaded internally in its outer end and screwed onto the threaded projecting end of the motor axle A. The other end of said axle has the hand crank C movably engaged therewith for cranking as hereinbefore described. The said clutch sleeve E is slidable lengthwise upon shaft S and its tubular extension 2 projects into casing G a sufficient distance to make clutching connection with said shaft but normally is disengaged under pressure of spring 3 about the same and located between the flange 4 thereon and said bearing *b*. Notches 5 in the edge of said clutch are adapted to engage projections 6 on shaft S, and a pin 7 through a slot 8 in extension 2 of said sleeve and fixed at its ends in casing G slidably and rotatably engages said parts E and G. The said part G being also rotatably threaded upon shaft or axle A of the motor it follows that when the clutch E is carried forward into clutching engagement with shaft S and the motor is rotated the said shaft will be rotated also, and this is true whether rotation is by power or hand crank. For hand crank operation I employ the simple mechanism seen in Fig. 4 and consisting of the hand controlled lever L, the secondary lever L' and the connecting link 10. Both said levers are pivotally mounted at about their middle on fixed portions of frame F or other suitable support and lever L' is bifurcated to engage at opposite sides of the flanged head of said clutch sleeve E and press it to clutching position. Spring 3 throws the sleeve back when the lever is released. By these means I can set the engines at work initially to operate the motor as a pump and fill tank T with compressed air. After that the tank takes care of conditions and it is kept up to about a normal charge by occasional storing as the service demands. How this is accomplished will now appear.

The motor or pump M has been described as rotary, and the rotor R therein is mounted eccentrically in this casing and has vanes or blades $m$ slidably mounted therein and held at work by springs $m'$ behind the same. Between tank T and the motor there is interposed all the mechanism adapted to charge the tank with compressed air to start the motor and to operate the clutch mechanism preparatory to starting. The said mechanism comprises sundry related parts including what is termed a valve pipe P because three several valves $v$, $v'$ and $v^2$ are located therein. The said valves are supported in suitable couplings or casings having the usual diaphragm for seating the valves and connected by pipe sections and T's making as a whole the valve pipe marked P. The working relation of tank T to these parts is shown in Fig. 1, but it is in diagram in Fig. 2 with other parts for clearness of apprehension and because no arbitrary position for said tank is required. As shown a pipe 14 connects the same with pipe P between valves $v$ and $v'$, and in this case these valves seat from above downward. Normally therefore the tank is cut off from the motor and the tank pressure is on both said valves. A hand controlled rod H is provided to operate said valves, and to this end bell crank levers $h$, $h'$ and $h^2$ are hung in their angle from or upon projections from valve pipe P and engaged at one end with said rod H and having their other ends or arms in lifting relations beneath the stem of the corresponding valves, $v$, $v'$ and $v^2$, respectively. But lever $h$ is pivoted to operate in one direction of actuating rod H and levers $h'$ and $h^2$ to operate in the opposite direction of actuation, and a hand lever H' located conveniently on the hood of the machine in front of the driver enables him to easily reach and control the operations of the machine and such control compasses all the operations of the motor and pump M as well.

From pipe P, so-called, there are several pipe connections or pumps entering motor casing M, one on either side of the dead point of the rotor R in the casing by pipes $n$ and $n^2$ and the other $n'$ through the hub or neck thereof to an annular channel in axle A and thence through said axle into valve casing G and against piston J. In addition there is a cross connection $n^3$ between pipes $n$ and $n^2$ comprising a T coupling at its middle with which pipe $n'$ is connected and containing a double acting sliding check valve $v^4$ of substantially plug shape and adapted to close one or the other stem of said coupling while the other is left open. Obviously since pipes $n$ and $n^2$ enter the motor on opposite sides of its dead area, the rotor may be air driven when opened thereto from the tank. Thus, suppose it be desired to crank the machine for starting with the air tank under suitable compression. The operator would then simply impart a forward movement to hand lever H' which would actuate crank lever $h$ through rod H and open valve $v$ to air from the tank. Meantime valve $v'$ would remain closed and the compressed air would rush into the motor through channel $n$ and to the clutch operating piston J, Fig. 4, through channel $n'$ as just described. This latter action would drive the clutch member or sleeve E forward to interlock with pins 6 on shaft S and thus bring the motor into power relations with said shaft, while the line of pressure through channel or passage $n$ would drive the motor. Both these actions will continue together as long as lever H' holds them open through valve $v$, and they are jointly cut off and the motor stopped when lever H' is relaxed or reversed, and which is its normal position. A spring may be provided to help or hold this movement. When valve $v$ is opened, pressure from the tank also shifts check valve $v^4$ to close the cross passage 15 to pipe $n^2$. Exhaust from motor M is through pipe $n^2$ and through valve $v^2$ which is normally open. When valve $v$ is closed, or rather permitted to close, the air pressure is cut off from pipe $n'$ and piston J and then spring 3 will withdraw the clutch from shaft S. This is done as soon as the engine has started.

The foregoing construction provides for cranking the machine from the driver's seat at any and all times and as frequently as may be necessary with storage tank T and motor M as the principal factors. Of course this implies a sustained pressure of motive energy in tank T as whatever is used out must be replaced. For this purpose motor M is used as a compressor and is driven by the engine D. The pipe or passage $n^2$ has to do with this phase of the operations, and incidentally valves $v'$ and $v^2$. As shown in Fig. 2 valve $v^2$ is open to exhaust at 20 through pipe P and from the motor by pipe $n^2$. But when air is to be compressed into tank T the valve $v'$ is opened and valve $v^2$ closed. This closes the normal exhaust and opens the channel through pipe $n^2$ and valve pipe P thence to the tank, so that whatever air remaining under compression in tank T will pass through the pipes to cross pipe 15, and into pipe $n'$, valve $v^4$ being automatically shifted to close the passage leading to pipe $n$. Piston J is thereby pressure actuated to throw the clutch E into working relation with crank shaft S which is presumably rotating under its own power at this time, and rotor R is now power driven to serve as a compressor for replenishing tank T. In this operation the pressure obtained from motor M (now a pump) maintains check valve $v^4$ in its shifted position and keeps piston J in clutching relation with the crank shaft until the desired compression or storage in tank T is obtained. During this operation, intake of air to motor or pump M is through a check valve K in the motor casing.

If for any reason the pressure in tank T should be insufficient to throw the parts into clutching relation for storing up a compressed air supply while the engine is running, the operator is still enabled to bring this result about from the seat of the vehicle by pull upon cable or connection I leading from the dash $d$ to the upper end of lever L'. Pull upon lever L also effects the same result.

Obviously any elastic, expansible, gaseous or liquid fluid that will work or may be preferred, may be used for the purposes herein described, and the tank T can be constructed and arranged according to the particular agent used.

What I claim is:

1. In a road machine having an engine shaft, a rotary device adapted to be operatively connected with one end of said shaft, an air storage tank and a plurality of air passages open from said tank into said rotary device, valves controlling the passage of air in said passages respectively, a hand lever and mechanism therefrom adapted to open and close said valves and an air passage between said passages leading to the connection between the said rotary device and said shaft and a piston in said latter passage adapted to close said connection with the shaft.

2. In a road machine, an engine driven shaft, a rotary motor and coupling connections between said parts comprising a piston chamber and piston, in combination with a source of fluid pressure and a passage therefrom to said piston chamber, said passage being located in part through the axle of said motor.

3. In a road machine, a motor having a shaft and a piston casing forming an extension of said shaft, an engine shaft and a coupling operatively uniting said engine shaft and said casing having a piston on the end thereof in said casing.

4. In a road machine, a motor and a source of stored fluid energy open thereto, in combination with an engine shaft and coupling mechanism between said engine shaft and motor to drive said shaft comprising a piston chamber and a coupling having a piston in said chamber and adapted to be forced into working engagement with said engine shaft.

5. In a road machine, a rotary motor having a shaft and an engine shaft in line therewith, in combination with a slidably mounted coupling adapted to operatively engage said shafts, said coupling provided with a piston and a fluid passage open to the space between said piston and said motor shaft, whereby said coupling is fluid actuated.

6. In a road machine, an engine shaft, a rotary motor axially in line with said shaft and having a fluid passage axially through the same, a piston at the end of said motor shaft exposed to said fluid passage, a clutch operatively engaged by said piston and adapted to engage said engine shaft, and a fluid pressure source and a passage therefrom adapted to discharge into said motor and into said fluid passage alike.

In testimony whereof I affix my signature in presence of two witnesses.

JOHN S. CLARKE.

Witnesses:
E. M. FISHER,
H. T. FISHER.